(12) United States Patent
Fujiwara

(10) Patent No.: US 7,752,673 B2
(45) Date of Patent: Jul. 6, 2010

(54) TELEVISION RECEIVING APPARATUS

(75) Inventor: Kazuyuki Fujiwara, Daito (JP)

(73) Assignee: Funai Electric Co., Ltd., Osaka (JP)

( * ) Notice: Subject to any disclaimer, the term of this patent is extended or adjusted under 35 U.S.C. 154(b) by 1340 days.

(21) Appl. No.: 11/195,935

(22) Filed: Aug. 3, 2005

(65) Prior Publication Data

US 2006/0028362 A1    Feb. 9, 2006

(30) Foreign Application Priority Data

Aug. 3, 2004    (JP)    ............... 2004-227267

(51) Int. Cl.
G06F 7/04    (2006.01)
G06F 17/30    (2006.01)
(52) U.S. Cl. .......................... 726/26; 726/29
(58) Field of Classification Search ............ 726/26, 726/29
See application file for complete search history.

(56) References Cited

U.S. PATENT DOCUMENTS

| | | | |
|---|---|---|---|
| 6,591,314 B1 * | 7/2003 | Colbath ....................... | 710/36 |
| 2004/0239816 A1 * | 12/2004 | Ando .......................... | 348/705 |
| 2005/0154917 A1 * | 7/2005 | deCarmo ..................... | 713/201 |
| 2006/0095623 A1 * | 5/2006 | Nio et al. ..................... | 710/260 |
| 2007/0112685 A1 * | 5/2007 | Yamamichi ................... | 705/64 |

FOREIGN PATENT DOCUMENTS

| JP | 2001-184788 | 7/2001 |
|---|---|---|
| JP | 2002-169532 | 6/2002 |
| JP | 2003-29729 | 1/2003 |
| JP | 2003-241724 | 8/2003 |
| JP | 2004-95159 | 3/2004 |

OTHER PUBLICATIONS

Patent Abstracts of Japan, Publication No. 2002-169532, Publication Date Jun. 14, 2002, 1 page.
Patent Abstracts of Japan, Publication No. 203-029729, Publication Date Jan. 31, 2003, 1 page.
Patent Abstracts of Japan, Publication No. 2003-241724, Publication Date Aug. 29, 2003, 1 page.
Japanese Office Action dated Jul. 21, 2008, for Japanese patent application Publication No. 2004-227267 and English translation thereof, 3 pages.

* cited by examiner

Primary Examiner—Christopher J Brown
(74) Attorney, Agent, or Firm—Osha • Liang LLP

(57) ABSTRACT

A television receiving apparatus having an HDCP authentication function of protecting the video contents from illegal copy, including: an analog input terminal for inputting a composite signal or component signal; a digital input terminal for inputting a digit video signal conforming to the DVI standards; switching means for switching internally between the analog input terminal and the digital input terminal; and switching control means for controlling the switching means to switch the internal connection from a digital input terminal side to an analog input terminal side, when the HDCP authentication is unsuccessful in a state where the digital input terminal and a digital output terminal of an external device are connected.

3 Claims, 3 Drawing Sheets

TELEVISION RECEIVING APPARATUS

BACKGROUND OF THE INVENTION

1. Field of the Invention

The present invention relates to a television receiving apparatus having an analog input terminal that is an input terminal of a composite signal or component signal, and a digital input terminal that is an input terminal of a digit video signal conforming to the DVI standards, and having an HDCP (High-bandwidth Digital Content Protection) authentication function of protecting the video contents from illegal copy.

2. Description of the Related Art

In recent years, television receiving apparatuses or display monitor devices having a digital interface are commercially available on the market.

Such a television receiving apparatus has an analog input terminal that is an input terminal of a composite signal or component signal, and a digital input terminal that is an input terminal of a digit video signal conforming to the DVI standards. The DVI standards include DVI-D having an interface coping with only the digital signal and DVI-I having an interface coping with both the digital signal and the analog signal.

In the conventional television receiving apparatuses, it was proposed that the video is displayed on the screen by detecting the kind of DVI connector (e.g., refer to JP-A-2002-169532), the OSD is switched to conform to the respective video specifications by checking whether or not the input video signal was analog or digital (e.g., refer to JP-A-2003-29729), and a function is provided of automatically discriminating whether the input video signal is analog or digital (e.g., refer to JP-A-2003-241724).

On the other hand, in the television receiving apparatuses having such digital interface, the video of high image quality and high resolution can be easily obtained with the digital signal, whereby there is possibility that the video contents may be copied illegally. Therefore, the television receiving apparatus having an HDCP authentication function of preventing illegal copy of the video contents is provided.

SUMMARY OF THE INVENTION

In the HDCP authentication, it is confirmed that a DVI cable of an external device (e.g., DVD player) is connected to the television receiving apparatus before outputting the video. Such HDCP authentication is not performed after the authentication is once made, except when the resolution is changed or the DVI cable is pulled out or inserted to pause the video. As a result of the HDCP authentication, when the HDCP authentication is successful, the encrypted digital signal is sent from the external device to the television receiving apparatus, while when the HDCP authentication is unsuccessful, the output is turned off. That is, when the authentication is unsuccessful, the DVI output from the external device is muted, making a monitor screen of the television receiving apparatus blackout. Therefore, when the user tried to see the composite or component video from that situation, it was required to switch the internal connection from the digital input terminal to the analog input terminal by manipulating an input switch key of the television receiving apparatus, which was a troublesome job for the user.

This invention has been achieved to solve the above-mentioned problems, and it is an object of the invention to provide a television receiving apparatus that can automatically switch from the DVI input to a composite or component input screen, when the HDCP authentication is unsuccessful.

The present invention provides a television receiving apparatus having an HDCP authentication function of protecting video contents from illegal copy, including: an analog input terminal for inputting a composite signal or component signal; a digital input terminal for inputting a digit video signal conforming to the DVI standards; switching means for switching internally between the analog input terminal and the digital input terminal; and switching control means for controlling the switching means to switch the internal connection from a digital input terminal side to an analog input terminal side, when the HDCP authentication is unsuccessful in a state where the digital input terminal and a digital output terminal of an external device are connected.

In this way, since the internal connection is automatically switched from the digital input terminal side to the analog input terminal side when the HDCP authentication is unsuccessful, the user can switch the monitor screen to the composite or component video without performing the key operation, even if the HDCP authentication is unsuccessful so that the monitor screen becomes a blackout.

In this case, the switching control means may control the switching means to perform a process of switching the internal connection from the analog input terminal side to the digital input terminal side and making the HDCP authentication again, when it is detected that no analog signal is inputted from the analog input terminal in a state where the internal connection is switched to the side of the analog input terminal. In this way, when no analog signal is inputted, the HDCP authentication is retried, whereby there is the possibility that the HDCP authentication is successful by retrying it even if the first HDCP authentication is unsuccessful due to any influence of the noise.

Also, the switching control means may control the switching means to perform a process, repeatedly plural times, of switching the internal connection from the analog input terminal side to the digital input terminal side and making the HDCP authentication again, when it is detected that no analog signal is inputted from the analog input terminal in a state where the internal connection is switched to the side of the analog input terminal. Thereby, there is the possibility that the HDCP authentication is successful by retrying it plural times even if the HDCP authentication is unsuccessful due to any influence of the noise. In this case, a message indicating that the HDCP authentication is unsuccessful may be displayed on the monitor screen, when the HDCP authentication is unsuccessful after repeating it plural times. Thereby, the use can visually ascertain that the HDCP authentication is unsuccessful plural times, and inspect possible nonconformity such as a connection failure of the DVI cable.

With the television receiving apparatus of the invention, since the internal connection is automatically switched from the digital input terminal side to the analog input terminal side when the HDCP authentication is unsuccessful, the user can switch the monitor screen to the composite or component video without performing any key operation, even when the monitor screen becomes a blackout because the HDCP authentication is unsuccessful.

Also, with the television receiving apparatus of the invention, since the internal connection is switched again from the analog input terminal side to the digital input terminal side and the HDCP authentication is made again, when it is detected that no analog signal is inputted from the analog input terminal in a state where the internal connection is switched to the side of the analog input terminal, there is the possibility that the HDCP authentication is successful by retrying it even if the first HDCP authentication is unsuccessful due to any influence of the noise.

Also, with the television receiving apparatus of the invention, since a process of switching the internal connection from the analog input terminal side to the digital input terminal side and making the HDCP authentication again is repeated plural times, when it is detected that no analog signal is inputted from the analog input terminal in a state where the internal connection is switched to the side of the analog input terminal, there is further the possibility that the HDCP authentication is successful by retrying it plural times even if the HDCP authentication is unsuccessful due to any influence of the noise. In this case, since a message indicating that the HDCP authentication is unsuccessful is displayed on the monitor screen, when the HDCP authentication is unsuccessful after repeating it plural times, the use can visually ascertain that the HDCP authentication is unsuccessful plural times, and inspect possible nonconformity such as a connection failure of the DVI cable.

DETAILED DESCRIPTION OF THE PREFERRED EMBODIMENTS

The preferred embodiments of the present invention will be described below with reference to the drawings.

Figure 1:
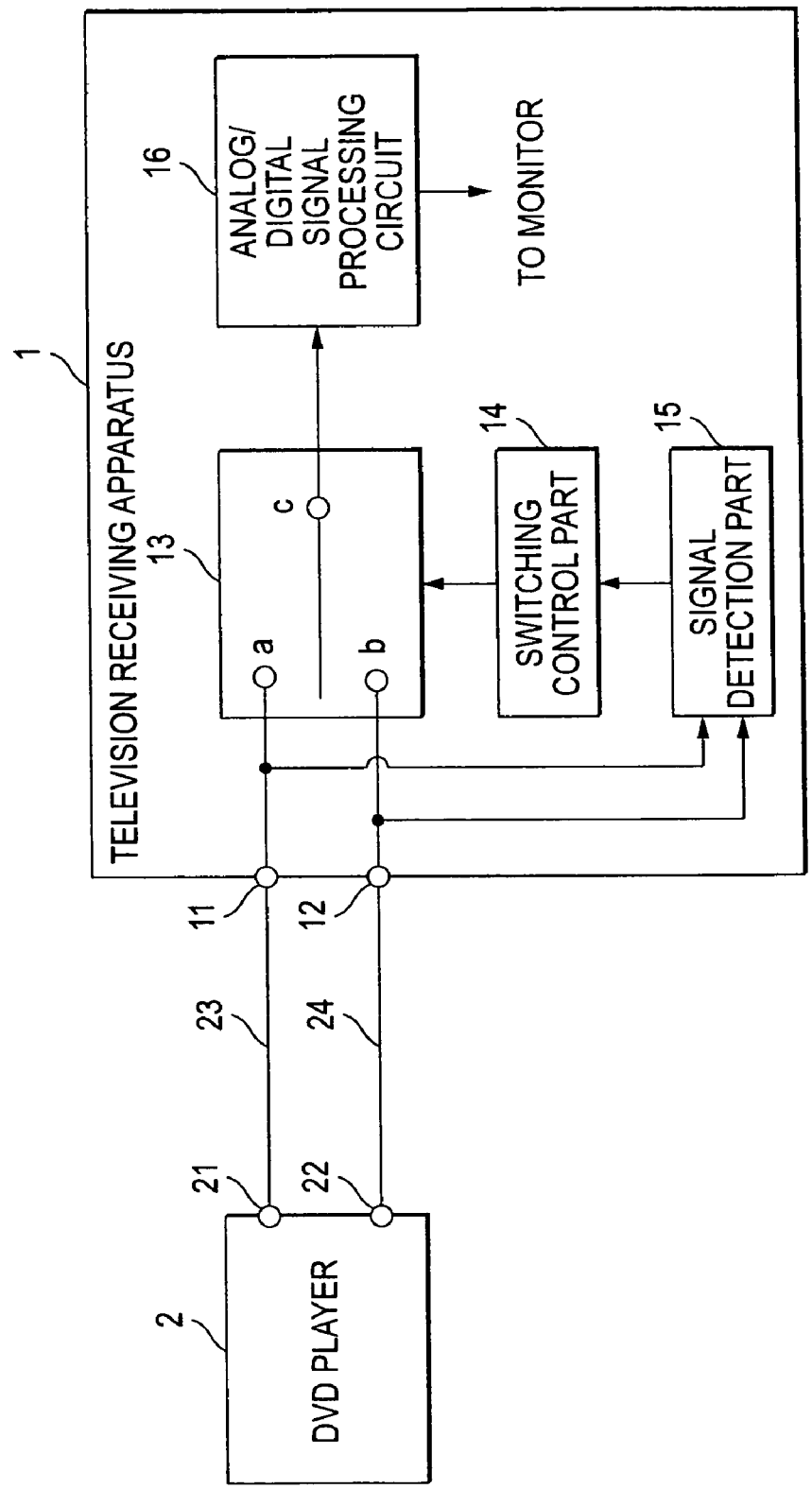
FIG. 1 is a functional block diagram showing the electrical configuration of the main parts of a television receiving apparatus according to an embodiment of the invention, in which the television receiving apparatus is connected to a DVD player as an external device through a DVI cable.

FIG. 1 is a functional block diagram showing the electrical configuration of the main parts of a television receiving apparatus according to the invention, in which the television receiving apparatus is connected to a DVD player as an external device through a DVI cable.

The television receiving apparatus 1 of this embodiment has an analog input terminal 11 that is an input terminal of a preset composite signal or component signal, and a digital input terminal 12 that is an input terminal of a digit video signal conforming to the DVI standards, and has an HDCP authentication function of protecting the video contents from illegal copy. Also, the television receiving apparatus comprises a change-over switch 13 for switching internally between the analog input terminal 11 and the digital input terminal 12, a switching control part 14 for controlling the change-over switch to switch, and a signal detection part 15 for detecting a composite signal or component signal inputted into the analog input terminal 11 and a digital signal inputted into the digital input terminal 12.

The analog input terminal 11 is connected to one terminal a of the change-over switch 13, and the digital input terminal 12 is connected to the other terminal b of the change-over switch 13. A common terminal c of the change-over switch 13 is connected to an analog/digital signal processing circuit 16. Also, the output of the signal detection part 15 is connected to the switching control part 14, and the output of the switching control part 14 is connected to a switching control terminal of the change-over switch 13.

Also, the analog input terminal 11 of the television receiving apparatus 1 and an analog output terminal 21 of the DVD player 2 are connected through an analog cable 23. The digital input terminal 12 of the television receiving apparatus 1 and a digital output terminal 22 of the DVD player 2 are connected through a DVI cable 24.

In this state, the switching control part 14 performs the HDCP authentication in this embodiment. When the HDCP authentication is unsuccessful, the switching control part 14 controls the change-over switch 13 to switch the internal connection from the side of the digital input terminal 12 to the side of the analog input terminal 11.

Next, the switching control examples for the input screen (i.e., input terminal) in the television receiving apparatus 1 with the above constitution are given below.

First Embodiment

A first embodiment is a basic processing operation of controlling the switching of the input screen in the television receiving apparatus with the above constitution. Referring to a flowchart of FIG. 2, the first embodiment will be described below.

The HDCP authentication is performed when an external input (video input) is selected as the input of the television receiving apparatus 1 in a state where both the television receiving apparatus 1 and the DVD player 2 are powered on.

That is, the switching control part 14 of the television receiving apparatus 1 firstly controls the change-over switch 13 to switch the common terminal c to the side of the terminal b, namely, the internal connection to the side of the digital input terminal 12 (step S1). And it is checked whether or not the DVI cable 24 is connected to this digital input terminal 12 (step S2). Consequently, if the DVI cable 24 is connected (Yes at step S2), the HDCP authentication is started by exchanging the individual keys with the DVD player 2 via the DVI cable 24 (step S3).

That is, it is checked whether or not the encrypted video signal is inputted via the DVI cable 24 from the DVI player 2 based on the signal detected by the signal detection part 15 (step S4). Consequently, if the encrypted video signal is inputted (Yes at step S4), the video signal is decoded to check whether or not the video signal is normally reproduced, and determine whether or not the authentication is successful (step S5). When the authentication is successful (Yes at step S5), the encrypted video signal inputted into the digital input terminal 12 is inputted via the change-over switch 13 into the digital signal processing part of the analog/digital signal processing circuit 16, where the video signal is normally decoded and displayed on the monitor screen, not shown.

On the other hand, when the authentication is unsuccessful (No at step S5), the switching control part 14 controls the change-over switch 13 to switch the common terminal c to the side of the terminal a, namely, the internal connection from the side of the digital input terminal 12 to the side of the analog input terminal 11 that is the input terminal of preset composite signal or component signal (step S6). Thereby, the analog video signal inputted via the analog input terminal 11 via the change-over switch 13 into the analog signal processing part of the analog/digital signal processing circuit 16, processed through a predetermined signal processing, and displayed on the monitor screen. Thereby, it is possible to automatically switch to the video-input screen of preset composite or component.

Second Embodiment

Figure 3:
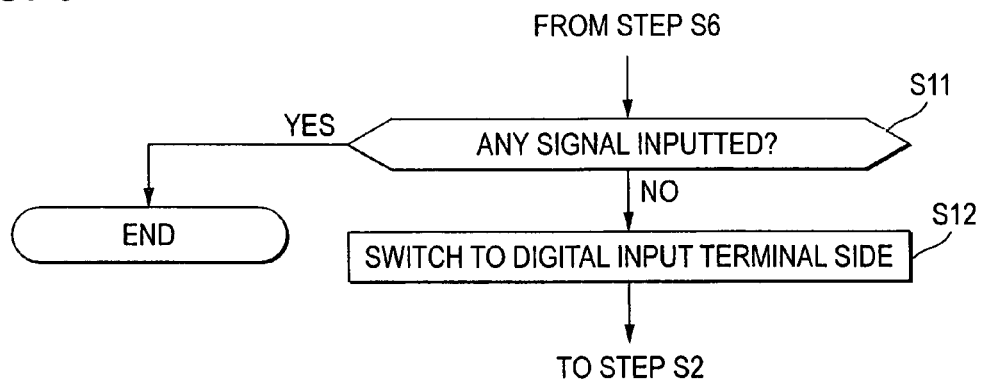
FIG. 3 is a flowchart for explaining a processing operation of switching the input screen in the television receiving apparatus according to a second embodiment of the invention.

Though the first embodiment is the basic processing operation of input screen switching control, there is not necessarily the video input of composite or component on the side of the analog input terminal 11 when the connection is switched to the side of the analog input terminal 11 at step S6. This second embodiment is a processing operation in this case. Referring to a flowchart of FIG. 3, the second embodiment will be described below.

Figure 2:
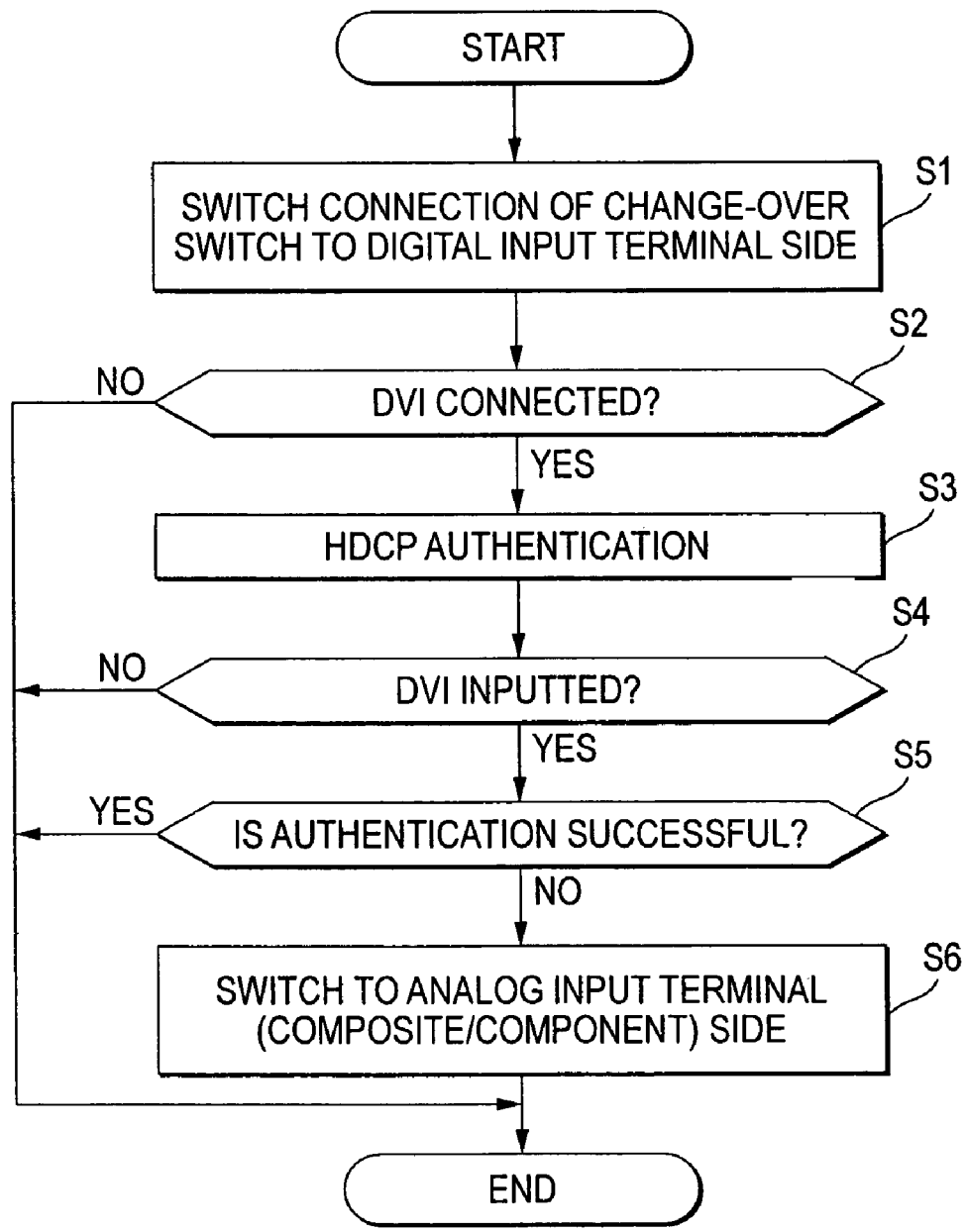
FIG. 2 is a flowchart for explaining a processing operation of switching the input screen in the television receiving apparatus according to a first embodiment of the invention.

After the switching control part 14 switches the internal connection from the digital input terminal 12 to the analog input terminal 11 at step S6 as shown in FIG. 2, it is checked whether or not any composite signal or component signal is inputted into the analog input terminal 11 based on the signal detected by the signal detection part 15 (step S11). As a result, if there is no signal input (No at step S11), the switching control part 14 controls the change-over switch 13 to switch the common terminal c to the side of the terminal b, namely, the internal connection from the side of the analog input terminal 11 to the side of the digital input terminal 12 (step S12). Then, the procedure returns to step S2 of FIG. 2 to start the HDCP authentication.

In this way, when no analog signal is inputted into the analog input terminal 11, the internal connection is switched to the digital input terminal 12 again to retry the HDCP authentication, whereby when the first HDCP authentication is unsuccessful due to any influence of the noise, for example, there is the possibility that the HDCP authentication is successful by this retry.

Third Embodiment

Figure 4:
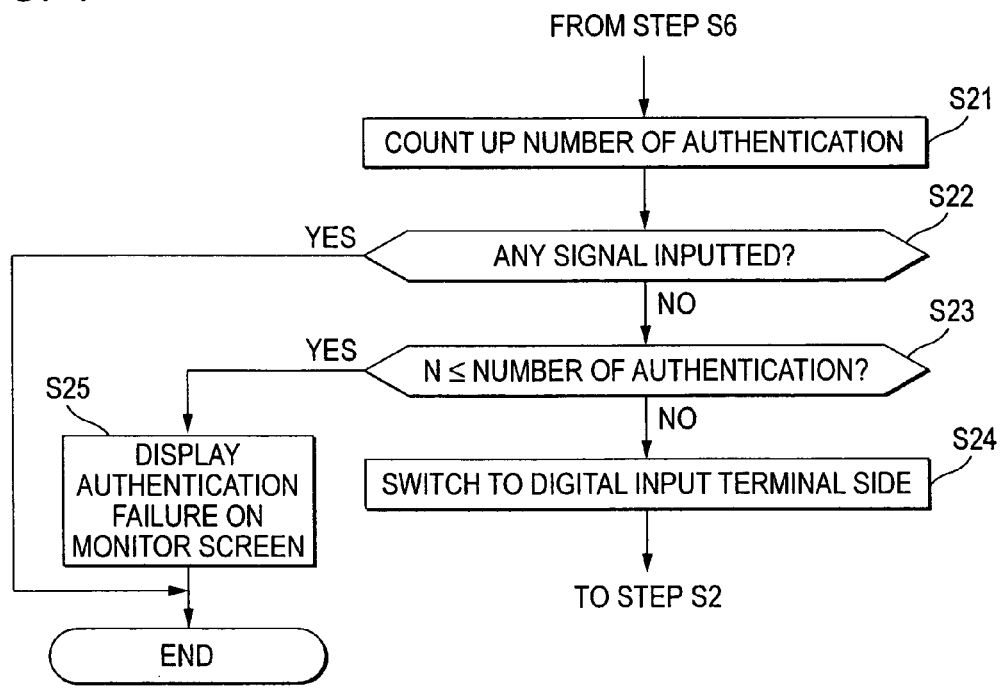
FIG. 4 is a flowchart for explaining a processing operation of switching the input screen in the television receiving apparatus according to a third embodiment of the invention.

Though in the second embodiment, when no analog signal is inputted into the analog input terminal 11, the internal connection is switched to the side of the digital input terminal 12 again to retry the HDCP authentication, in this third embodiment, this retry is repeated plural times. Referring to a flowchart of FIG. 4, the third embodiment will be described below.

After the switching control part 14 switches the internal connection from the digital input terminal 12 to the analog input terminal 11 at step S6 as shown in FIG. 2, the number of authentication is counted up by an internal counter, not shown (step S21). Next, it is checked whether the composite signal or component signal is inputted into the analog input terminal 11 based on the signal detected by the signal detection part 15 (step S22). As a result, if there is no signal input (No at step S22), the switching control part 14 checks whether or not the HDCP authentication is performed by a preset number of times (e.g., N times) (step S23). If the preset number of times is not reached (No at step S23), the switching control part controls the change-over switch 13 to switch the common terminal c to the side of the terminal b, namely, the internal connection from the side of the analog input terminal 11 to the side of the digital input terminal 12 (step S24). Then, the procedure returns to step S2 of FIG. 2 again to start the HDCP authentication. Thereby, when the HDCP authentication is unsuccessful so far due to any influence of the noise, the possibility that the HDCP authentication is successful by plural retries is increased.

On the other hand, when the HDCP authentication is performed up to the preset number of times (Yes at step S23), namely, the HDCP authentication is unsuccessful even by performing it N times, a message indicating that the HDCP authentication is unsuccessful is displayed on the monitor screen (step S25). Thereby, the user can visually ascertain that the HDCP authentication is unsuccessful plural times, and inspect any possible nonconformity such as a connection failure of the DVI cable.

The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A television receiving apparatus, comprising:
    an analog input terminal adapted to be connected to an external device and to receive an analog video signal from the external device;
    a digital input terminal adapted to be connected to the external device to receive a digital video signal conforming to a DVI standard from the external device;
    a switch configured to connect with either the analog input terminal or the digital input terminal; and
    a switching controller configured to execute a HDCP authentication when the digital input terminal receives the digital video signal, and configured to cause the switch to connect with the analog input terminal when the HDCP authentication is unsuccessful.

2. The television receiving apparatus according claim 1, wherein the switching controller is configured to cause the switch to connect with the digital input terminal and to execute the HDCP authentication again, in a case where no analog video signal is inputted from the analog input terminal.

3. The television receiving apparatus according to claim 1, wherein the external device is a DVD player.

\* \* \* \* \*